(12) United States Patent
Kligman et al.

(10) Patent No.: US 11,709,869 B2
(45) Date of Patent: Jul. 25, 2023

(54) DYNAMICALLY IDENTIFYING AND ASSOCIATING DISPARATE RECORDS

(71) Applicant: salesforce.com, inc., San Francisco, CA (US)

(72) Inventors: Samuel Louis Kligman, San Francisco, CA (US); Zhijian Huang, San Francisco, CA (US); Vinodh Rajagopal, San Francisco, CA (US); Sunil Dixit, San Francisco, CA (US); Sriram Gopalan, San Francisco, CA (US); Liang Xie, San Francisco, CA (US); Bowen Wang, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 45 days.

(21) Appl. No.: 17/389,440

(22) Filed: Jul. 30, 2021

(65) Prior Publication Data

US 2023/0032926 A1    Feb. 2, 2023

(51) Int. Cl.
*G06F 16/28*   (2019.01)
*G06F 16/22*   (2019.01)
*G06F 3/0484*  (2022.01)

(52) U.S. Cl.
CPC .......... *G06F 16/285* (2019.01); *G06F 3/0484* (2013.01); *G06F 16/2282* (2019.01)

(58) Field of Classification Search
CPC .. G06F 16/2282; G06F 16/285; G06F 16/288; G06F 3/0484
See application file for complete search history.

(56) References Cited

U.S. PATENT DOCUMENTS

| | | | | |
|---|---|---|---|---|
| 5,608,900 A * | 3/1997 | Dockter | ................ | G06F 16/182 |
| | | | | 707/999.102 |
| 10,157,195 B1 * | 12/2018 | Panwar | .................. | G06F 16/25 |
| 11,379,498 B2 * | 7/2022 | Gandhi | ............... | H04L 63/1416 |
| 2004/0254938 A1 * | 12/2004 | Marcjan | ................ | G06F 16/148 |
| 2021/0311931 A1 * | 10/2021 | Prajapati | ............. | G06F 16/2282 |

* cited by examiner

*Primary Examiner* — Robert W Beausoliel, Jr.
*Assistant Examiner* — Cheryl M Shechtman
(74) *Attorney, Agent, or Firm* — Butzel Long (57) ABSTRACT

Methods, computer readable media, and devices for dynamically identifying and associating disparate records are disclosed. One method may include receiving a first set of association criteria, identifying a first source object and a first target object based on the first set of association criteria, creating a first association object indicating an association between the first source object and the first target object, storing the first association object, receiving a second set of association criteria, identifying a second source object and a second target object based on the second set of association criteria, and creating a second association object.

17 Claims, 7 Drawing Sheets

DYNAMICALLY IDENTIFYING AND ASSOCIATING DISPARATE RECORDS

TECHNICAL FIELD

Embodiments disclosed herein relate to techniques and systems for defining a set of criteria and dynamically creating an association record that relates disparate records of various types within a customer relationship management platform.

BACKGROUND

Performance metrics may be identified and tracked for an individual (e.g., an employee). However, performance metrics for a unit (e.g., a branch) may not be easily identified and tracked when an individual moves between multiple units. For example, a banker may sit or otherwise perform work at a number of different bank branches. While metrics (e.g., leads, opportunities, accounts) for the banker may be easily identified, identifying an appropriate corresponding branch may not be so easily done.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, or the like. In other instances, well-known structures and devices are shown in block diagram form to facilitate describing the subject disclosure.

Embodiments disclosed herein provide techniques and systems for defining a set of criteria and dynamically creating an association record that relates disparate records of various types within a customer relationship management (CRM) platform. In particular, disclosed embodiments may enable identifying performance metrics for a unit, group, location, division, or other subcomponent of an organization based on individuals that move between or otherwise perform services on behalf of multiple components of the organization.

In various implementations, an association may be defined between various records of differing types based on predetermined criteria. In turn, an association record may be created when records matching the criteria are encountered. For example, an association may be defined between a source object (e.g., case, lead, or account), a target object (e.g., branch or account), a system action (e.g., create, delete, update), and a criteria (e.g., the defining criteria).

In a particular example, a lead record (i.e., a record indicating an interest) may be associated with a banker's active branch (i.e., the branch at which the banker is currently working) if the lead has a status field updated to indicate "Hot". In this example, the source object may be the lead record, the target object may be the banker's active/current branch, the system action may be an update or create, and the criteria may be "$Lead.Status='Hot'". Once an association has been defined, an association record may be created for any lead matching the association definition.

Of note, multiple different associations may be defined with each definition involving different record types. As such, any association record created and any datastore in which the various association records may be stored is not a simple join between two database tables. Rather, an association record represents a dynamically structured record that may represent a connection between various different disparate records. Furthermore, while examples herein specify a banker and a bank branch within financial services, this is only for simplicity.

Implementations of the disclosed subject matter provide methods, computer readable media, and devices for defining a set of criteria and dynamically creating an association record that relates a number of disparate records of various types within a CRM platform. In various implementations, a method for dynamically associating disparate records by a computerized information system may include receiving, from a user via a graphical user interface, a first set of association criteria including a source object criteria defining a source object type for which a system action is to be taken; a target object criteria defining a target object type; a system action criteria defining the system action; and a condition criteria defining a condition associated with the first set of association criteria, identifying a first source object and a first target object based on the first set of association criteria, creating a first association object indicating an association between the first source object and the first target object, the first association object dynamically structured based on the first source object and the first target object, and storing the first association object in a data store of the computerized information system. The method may further include receiving a second set of association criteria, identifying a second source object and a second target object based on the second set of association criteria, and creating a second association object.

In some implementations, the method may further include determining, based on one or more association objects, a performance metric associated with a target object.

In various implementations, the source object type may be selected from the list including: a case object type; a lead object type; a contact object type; an opportunity object type; an interaction object type; and an account object type.

In various implementations, identifying the first source object and the first target object based on the first set of association criteria may include receiving an event notification indicating an event occurred, the event associated with a source object, a target object, and a system action and evaluating the event notification to determine whether a source object type of the source object matches the source object criteria of the first set of association criteria, a target object type of the target object matches the target object criteria of the first set of association criteria, the system action matches the system action criteria of the first set of association criteria, and a result of the event notification matches the condition criteria of the first set of association criteria.

In some implementations, the method may further include storing the second association object in the data store of the computerized information system, wherein the data store is a database table, the source objects, the target objects, and the association objects are database records, and the first association object and the second association object are structurally different based on one or more of an object type of the first source object and an object type of the second source object are different and an object type of the first target object and an object type of the second target object are different.

In some implementations, the method may further include storing the second association object in a second data store of the computerized information system, the data store and the second data store having the same structure.

In various implementations, the first target object and the second target object are the same.

In some implementations, the method may further include identifying a third source object and a third target object based on either the first set of association criteria or the second set of association criteria and creating a third association object.

Figure 1A:
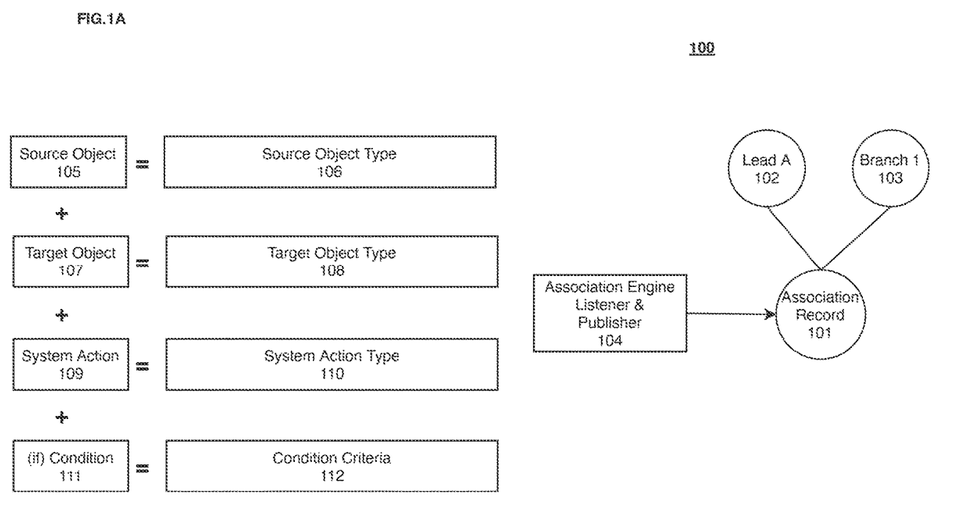
FIG. 1A is a block diagram illustrating a system for dynamically identifying and associating disparate records according to some example implementations.

FIG. 1A illustrates a system 100 for dynamically identifying and associating disparate records according to various implementations of the subject matter disclosed herein. In various implementations, system 100 may include an association engine listener and publisher 104 that creates association records, such as association record 101. Association engine listener and publisher 104 may create association records based on a set of criteria. For example, the set of criteria may include a source object 105, a target object 107, a system action 109, and a condition 111.

In various implementations, source object 105 may be of a particular type, such as source object type 106 (e.g., lead, case, account), target object 107 may be of a particular type, such as target object type 108 (e.g., branch, account, location), system action 109 may represent a particular type of action to be performed, such as system action type 110 (e.g., create, update, delete), and condition 111 may represent a particular criteria, such as condition criteria 112. As shown in FIG. 1A, association record 101 represents an association between a specific source object, such as Lead A 102, and a specific target object, such as Branch 1 103. In this way, an activity (e.g., updating a lead) performed by an individual may be easily associated with the location (e.g., branch) in which the individual performed the location. Although FIG. 1A shows a single association record, this is only for simplicity.

Figure 1B:
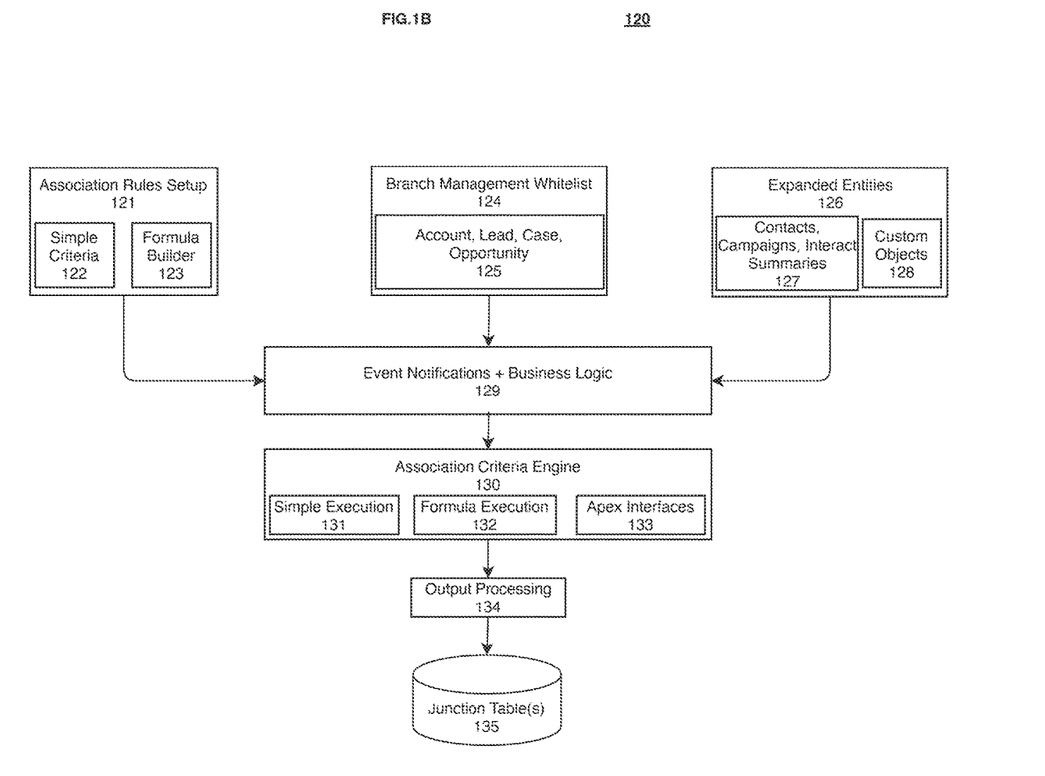
FIG. 1B is a block diagram illustrating a system for dynamically identifying and associating disparate records according to some example implementations.

FIG. 1B illustrates a system 120 for dynamically identifying and associating disparate records according to various implementations of the subject matter disclosed herein. In various implementations, system 100 may include, for example, event notifications and business logic 129, association criteria engine 130, output processing 134, and junction table(s) 135. System 100 may also include, for example, association rules setup 121, branch management whitelist 124, and expanded entities 126.

In some implementations, association rules setup 121 may include simple criteria 122 and formula builder 123. Association rules setup 121 may represent, for example, functionality to create or modify a set of association criteria for defining an association. Simple criteria 122 may represent, for example, a collection of criteria from which selections may be made for the set of association criteria. Formula builder 123 may represent, for example, functionality for creating or modifying formulas, such as a condition, for inclusion in the set of association criteria.

In some implementations, branch management whitelist 124 may include, for example, account, lead, case, opportunity 125. For example, account, lead, case, opportunity 125 may define or otherwise represent types of activity of interest for a particular branch or set of branches.

In some implementations, expanded entities 126 may include, for example, contacts, campaigns, interact summaries 127 and custom objects 128. For example, contacts, campaigns, interact summaries 127 and custom objects 128 may define or otherwise represent types of objects (i.e., source objects) of interest for association with performed activities.

In various implementations, event notifications and business logic 129 may reference or otherwise utilize association rules setup 121, branch management whitelist 124, and expanded entities 126 in order to review activities taken by individuals within a CRM platform and generate notifications based on those activities. Notifications generated by event notifications and business logic 129 may be passed to association criteria engine 130.

In some implementations, association criteria engine 130 may include, for example, simple execution 131, formula execution 132, and apex interfaces 133. Association criteria engine 130 may, for example, process notifications received from event notifications and business logic 129 in order to determine whether an association record is to be created. As part of this process, simple execution 131 may, for example, evaluate object types referenced or otherwise included in an event notification to determine whether a match with a set of association criteria exists. Similarly, formula execution 132 may, for example, evaluate conditions referenced or otherwise included in the event notification to determine whether a match with the set of association criteria exists. Apex interfaces 133 may, for example, enable custom process of the event notification.

If an event notification is determined to match a set of association criteria and an association record is to be created, output processing 134 may, for example, process the association record and store such association record in junction table(s) 135. That is, junction table(s) 135 may represent, for example, a data store in which association records may be stored.

Figure 1C:
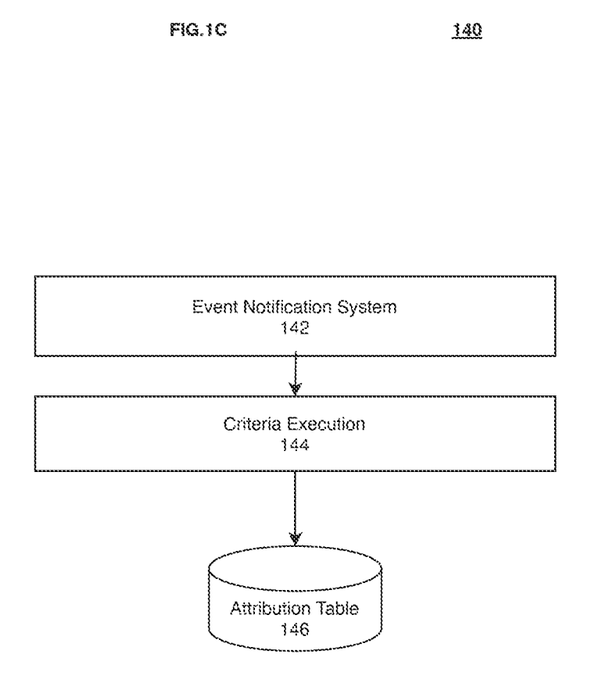
FIG. 1C is a block diagram illustrating a system for dynamically identifying and associating disparate records according to some example implementations.

FIG. 1C illustrates a system 140 for dynamically identifying and associating disparate records according to various implementations of the subject matter disclosed herein. In various implementations, system 140 may include, for example, event notification system 142, criteria execution 144, and attribution table 146. System 140 of FIG. 1C may be the same system as system 120 of FIG. 1B, but shown in a more simplistic form.

In various implementations, event notification system 142 may receive entity events within a CRM platform. Such events may include, for example, creation of a new record, updating of an existing record, and/or deletion of a record. Event notification system 142 may process each event and pass the event and/or information describing the event to criteria execution 144. Criteria execution 144 may, for example, process an event and compare the event and/or information describing the event to one or more sets of association criteria. A set of association criteria may define, for example, a source object having a particular source object type, a target object having a particular target object type, a system action of a particular system action type, and a condition criteria having a particular condition. If criteria execution 144 determines that an event matches a set of association criteria, an association record may be created and stored in attribution table 146.

Figure 1D:
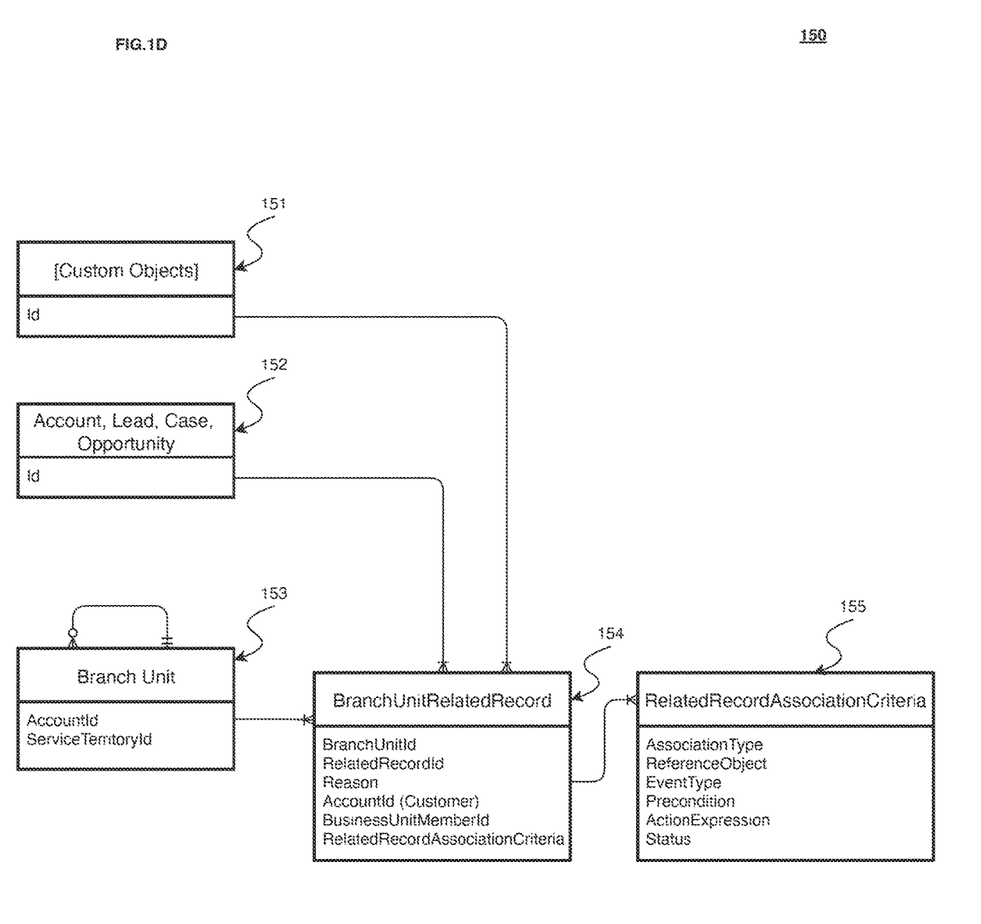
FIG. 1D illustrates a data relationship model for dynamically identifying and associating disparate records according to some example implementations.

FIG. 1D illustrates a data relationship model 150 for dynamically identifying and associating disparate records according to some example implementations. In various implementations, data relationship model 150 may include, for example, BranchUnitRelatedRecord record 154, RelatedRecordAssociationCriteria record 155, Branch Unit record 153, Account, Lead, Case, Opportunity record 152, and custom objects record 151.

BranchUnitRelatedRecord record 154 may, for example, represent an association record that associates a source object and a target object. RelatedRecordAssociationCriteria record 155 may, for example, represent a set of criteria on which the association record was created. Branch Unit record 153 may, for example, represent a target object for which the association record was created. Account, Lead, Case, Opportunity record 152 may, for example, represent a source object for which the association was created. Custom objects record 151 may, for example, represent a customized source or target object.

Figure 1E:
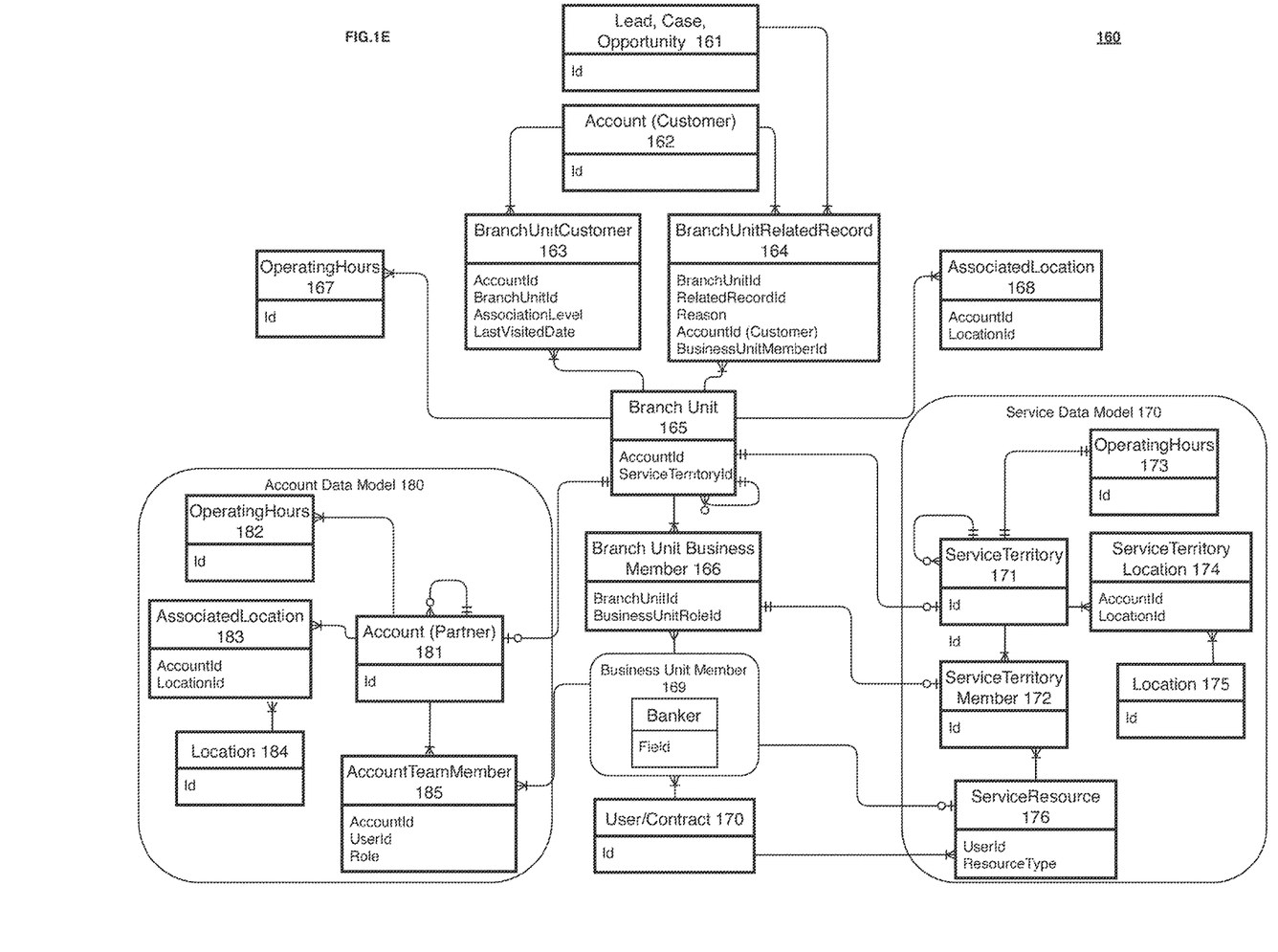
FIG. 1E illustrates a data relationship model for dynamically identifying and associating disparate records according to some example implementations.

FIG. 1E illustrates a data relationship model 160 for dynamically identifying and associating disparate records according to various implementations of the subject matter disclosed herein. In various implementations, data relationship model 160 may include, for example, lead, case, opportunity record 161, account (customer) record 162, BranchUnitCustomer 163, and BranchUnitRelatedRecord 164. Model 160 may also include branch unit record 165, branch unit business member record 166, operating hours record 167, AssociatedLocation record 168, business unit member 169, and user/contract 170. Model 160 may also include service data model 170 and account data model 180.

In various implementations, service data model 170 may include, for example, ServiceTerritory record 171, ServiceTerritoryMember record 172, OperatingHours record 173, ServiceTerritoryLocation record 174, location record 175, and ServiceResource record 176.

In various implementations, account data model 180 may include, for example, account (partner) record 181, OperatingHours record 182, AssociatedLocation record 183, location record 184, and AccountTeamMember record 185.

Figure 2:
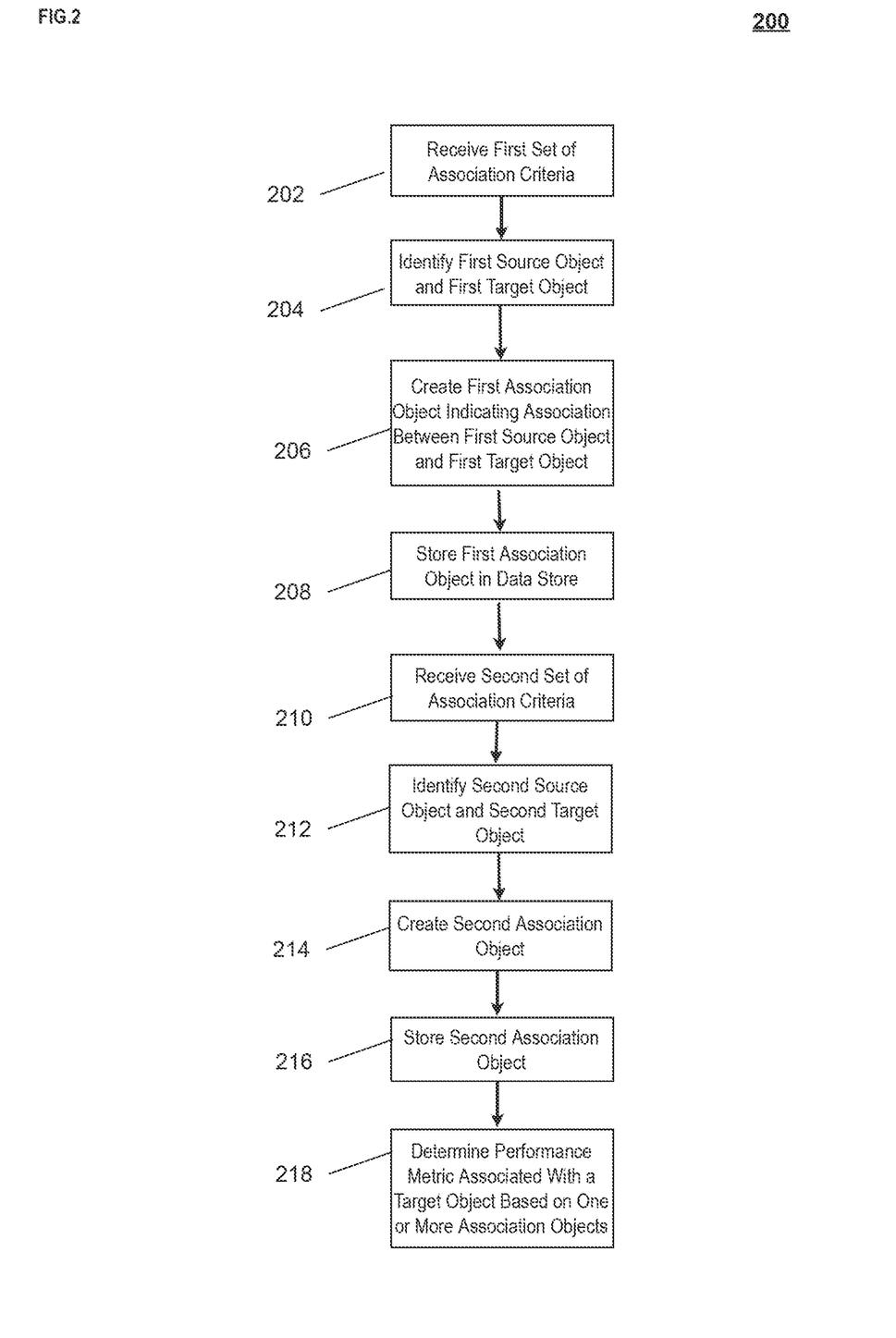
FIG. 2 is a flow diagram illustrating a method for use with determining a hyperparameter for influencing non-local samples in machine learning according to some example implementations.

FIG. 2 illustrates a method 200 for dynamically identifying and associating disparate records, as disclosed herein. In various implementations, the steps of method 200 may be performed by a server, such as electronic device 300 of FIG. 3A or system 340 of FIG. 3B, and/or by software executing on a server or distributed computing platform. Although the steps of method 200 are presented in a particular order, this is only for simplicity.

In step 202, a first set of association criteria may be received. In various implementations, the first set of association criteria may be received via a graphical user interface. The first set of association criteria may, for example, define an association between a source object and a target object. The first set of association criteria may include, for example, a source object criteria defining a source object type for which a system action is to be taken, a target object criteria defining a target object type, a system action criteria defining the system action, and a condition criteria defining a condition associated with the first set of association criteria.

In some implementations, the source object type may be one of a case, a lead, a contact, an opportunity, an interaction, and/or an account. In some implementations, the system action criteria may be one of create, delete, or update. In some implementations, the condition criteria may be, for example, a status or other criteria associated with either the source object or the target object.

In step 204, a first source object and a first target object may be identified. In various implementations, identification of the first source object and the first target object may be based, for example, on event notifications or other messages generated by a CRM platform. For example, an event notification indicating that an event has occurred may be received and evaluated. The event may be, for example, associated with a source object, a target object, and a system action. The event notification may be evaluated, for example, to determine whether a source object type of the source object matches a source object criteria of the first set of association criteria, a target object type of the target object matches a target object criteria of the first set of association criteria, the system action matches a system action of the first set of association criteria, and a result of the event matches a condition criteria of the first set of association criteria.

In step 206, a first association object may be created indicating association between the first source object and the first target object. In various implementations, the first association object may be dynamically structured based on the first source object and the first target object. For example, the first association object may have one structure if the source object has a first object type, but may have a different structure if the source object has a second object type.

In step 208, the first association object may be stored in a data store. In various implementations, the data store may be a database, a file, or other data structure.

In step 210, a second set of association criteria may be received. In various implementations, the second set of association criteria may be received via a graphical user interface. The second set of association criteria may, for example, define an association between a source object and a target object that is different from the association defined by the first set of association criteria. For example, while the first set of association criteria may be directed to a source object type of lead, the second set of association criteria may be directed to a source object type of account. In another example, the first set of association criteria may be directed to a first branch while the second set of association criteria may be directed to a second branch. Of note, while the first and second sets of association criteria may include some of the same elements, at least one element may be different.

In step 212, a second source object and a second target object may be identified. Similarly to step 204, identification of the second source object and the second target object may be based, for example, on event notifications or other messages generated by the CRM platform.

In step 214, a second association object may be created. In various implementations, the second association object may indicate, for example, an association between the second source object and the second target object. The second association object may be, for example, dynamically structured based on the second source object and the second target object.

In step 216, the second association object may be stored. In various implementations, the second association object may be stored in the same data store as the first association object. For example, the data store may be a database table and the source objects, target objects, and association objects may be database records. In this example, the first and second association objects may be structurally different based on one or more of: an object type of the first source object and an object type of the second source object being different; and an object type of the first target object and an object type of the second target object being different.

In some implementations, the second association object may be stored in a second data store. In some implementations, the second data store may have the same structure or a different structure as the data store.

In step 218, a performance metric may be determined. In various implementations, the performance metric may be associated with a target object and based on one or more association objects. For example, the performance metric may indicate a number of new accounts created for a particular branch (i.e., the branch represented by the target object) within a performance period.

As disclosed herein, an association between records having disparate types may be dynamically identified and recorded. Such association records may facilitate determining performance metrics that would otherwise be difficult to determine. Unlike a traditional database join that "joins" records of one type with records of a different type, dynamically structured association objects, as disclosed herein, enable associating source records of differing types with target records of differing types while still only referencing a single set of objects (i.e., association objects). In this way, a traditional CRM platform may be enhanced in an unconventional way to improve performance of the CRM platform.

As disclosed herein, determining an optimized hyperparameter for influencing non-local samples in machine learning may enable improved performance of a machine learning model by ensuring a sufficient amount of training data without losing personalization of a target entity. In a traditional approach, data from a single organization may be utilized to train a machine learning prediction model. However, such data may be limited (i.e., too small of a data sample) to sufficiently train the model. To offset the limited data of a single organization, data from a number of organizations may be used. The problem with using data from multiple organizations is that the various organizations may not be identical or sufficiently similar to accurately model for the target organization. By identifying an appropriate sample weight to be applied to data from other organizations, an amount of dissimilarity with the target organization may be minimized and the accuracy of the model may be improved. As such, the disclosed subject matter enables a machine learning prediction model to train using a larger set of data and, in turn, provide a more accurate prediction.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 3A:
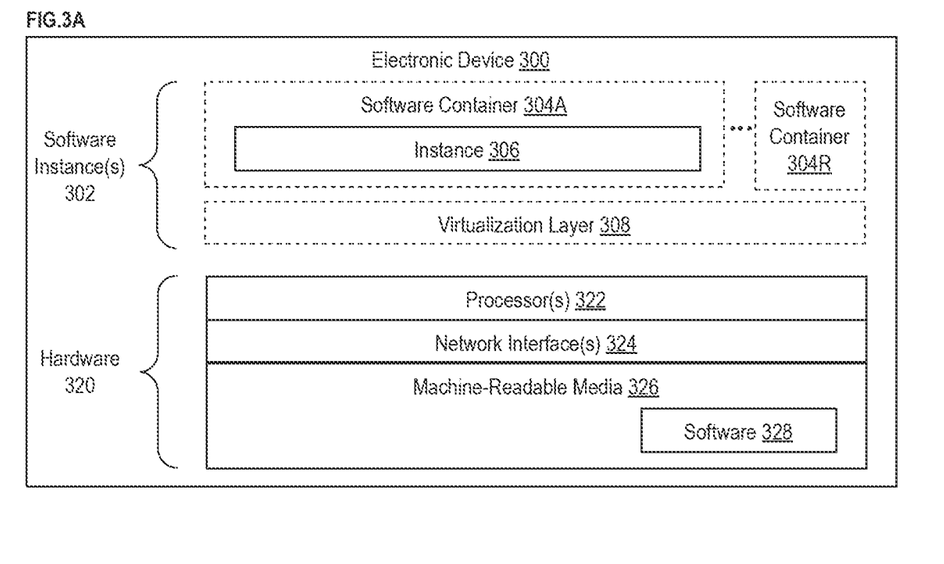
FIG. 3A is a block diagram illustrating an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and consolidated order manager may be implemented in one or more electronic devices 300.

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Figure 3B:
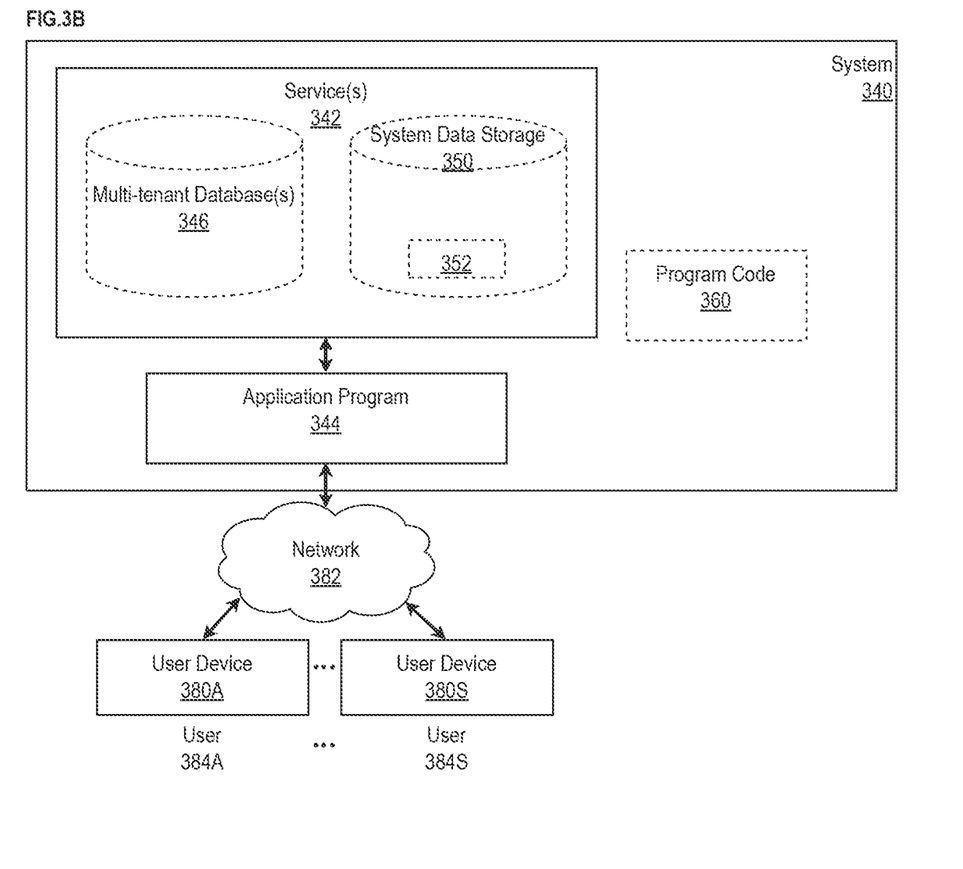
FIG. 3B is a block diagram of a deployment environment according to some example implementations.

FIG. 3B is a block diagram of a deployment environment according to some example implementations. A system 340 includes hardware (e.g., a set of one or more server devices) and software to provide service(s) 342, including a consolidated order manager. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services.

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM). For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the framework for modeling heterogeneous feature sets, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A computer-implemented method for dynamically associating disparate records by a computerized information system, the method comprising:
   receiving, from a user via a graphical user interface, a first set of association criteria comprising:
      a source object criteria defining a source object type for which a system action is to be taken;
      a target object criteria defining a target object type;
      a system action criteria defining the system action; and
      a condition criteria defining a condition associated with the first set of association criteria;
   identifying a first source object and a first target object based on the first set of association criteria;
   creating a first association object indicating an association between the first source object and the first target object, the first association object dynamically structured based on the first source object and the first target object;
   storing the first association object in a data store of the computerized information system;
   receiving a second set of association criteria;
   identifying a second source object and a second target object based on the second set of association criteria; and
   creating a second association object;
   storing the second association object in the data store of the computerized information system, wherein:
      the data store is a database table;
      the source objects, the target objects, and the association objects are database records; and
      the first association object and the second association object are structurally different based on one or more of:
         an object type of the first source object and an object type of the second source object are different; and
         an object type of the first target object and an object type of the second target object are different.

2. The computer-implemented method of claim 1, further comprising determining, based on one or more association objects, a performance metric associated with a target object.

3. The computer-implemented method of claim 1, wherein the source object type is selected from the list comprising:
 a case object type;
 a lead object type;
 a contact object type;
 an opportunity object type;
 an interaction object type; and
 an account object type.

4. The computer-implemented method of claim 1, wherein identifying the first source object and the first target object based on the first set of association criteria comprises:
 receiving an event notification indicating an event occurred, the event associated with a source object, a target object, and a system action; and
 evaluating the event notification to determine whether:
  a source object type of the source object matches the source object criteria of the first set of association criteria;
  a target object type of the target object matches the target object criteria of the first set of association criteria;
  the system action matches the system action criteria of the first set of association criteria; and
  a result of the event matches the condition criteria of the first set of association criteria.

5. The computer-implemented method of claim 1, further comprising storing the second association object in a second data store of the computerized information system, the data store and the second data store having the same structure.

6. The computer-implemented method of claim 1, wherein the first target object and the second target object are the same.

7. The computer-implemented method of claim 1, further comprising:
 identifying a third source object and a third target object based on either the first set of association criteria or the second set of association criteria; and
 creating a third association object.

8. A non-transitory machine-readable storage medium that provides instructions that, if executed by a processor, are configurable to cause the processor to perform operations comprising:
 receiving, from a user via a graphical user interface, a first set of association criteria comprising:
  a source object criteria defining a source object type for which a system action is to be taken;
  a target object criteria defining a target object type;
  a system action criteria defining the system action; and
  a condition criteria defining a condition associated with the first set of association criteria;
 identifying a first source object and a first target object based on the first set of association criteria;
 creating a first association object indicating an association between the first source object and the first target object, the first association object dynamically structured based on the first source object and the first target object;
 storing the first association object in a data store of the computerized information system;
 receiving a second set of association criteria;
 identifying a second source object and a second target object based on the second set of association criteria; and
 creating a second association object;
 storing the second association object in the data store of the computerized information system, wherein:
  the data store is a database table;
  the source objects, the target objects, and the association objects are database records; and
  the first association object and the second association object are structurally different based on one or more of:
   an object type of the first source object and an object type of the second source object are different; and
   an object type of the first target object and an object type of the second target object are different.

9. The non-transitory machine-readable storage medium of claim 8, wherein the operations further comprise determining, based on one or more association objects, a performance metric associated with a target object.

10. The non-transitory machine-readable storage medium of claim 8, wherein identifying the first source object and the first target object based on the first set of association criteria comprises:
 receiving an event notification indicating an event occurred, the event associated with a source object, a target object, and a system action; and
 evaluating the event notification to determine whether:
  a source object type of the source object matches the source object criteria of the first set of association criteria;
  a target object type of the target object matches the target object criteria of the first set of association criteria;
  the system action matches the system action criteria of the first set of association criteria; and
  a result of the event matches the condition criteria of the first set of association criteria.

11. The non-transitory machine-readable storage medium of claim 8, wherein the operations further comprise storing the second association object in a second data store of the computerized information system, the data store and the second data store having the same structure.

12. The non-transitory machine-readable storage medium of claim 8, wherein the first target object and the second target object are the same.

13. The non-transitory machine-readable storage medium of claim 8, wherein the operations further comprise:
 identifying a third source object and a third target object based on either the first set of association criteria or the second set of association criteria; and
 creating a third association object.

14. An apparatus comprising:
 a processor; and
 a non-transitory machine-readable storage medium that provides instructions that, if executed by a processor, are configurable to cause the processor to perform operations comprising:
  receiving, from a user via a graphical user interface, a first set of association criteria comprising:
   a source object criteria defining a source object type for which a system action is to be taken;
   a target object criteria defining a target object type;
   a system action criteria defining the system action; and
   a condition criteria defining a condition associated with the first set of association criteria;
  identifying a first source object and a first target object based on the first set of association criteria;
  creating a first association object indicating an association between the first source object and the first target object, the first association object dynamically structured based on the first source object and the first target object;

storing the first association object in a data store of the computerized information system;

receiving a second set of association criteria;

identifying a second source object and a second target object based on the second set of association criteria; and creating a second association object;

storing the second association object in the data store of the computerized information system, wherein:

the data store is a database table;

the source objects, the target objects, and the association objects are database records; and the first association object and the second association object are structurally different based on one or more of:

an object type of the first source object and an object type of the second source object are different; and an object type of the first target object and an object type of the second target object are different.

15. The apparatus of claim 14, wherein the operations further comprise determining, based on one or more association objects, a performance metric associated with a target object.

16. The apparatus of claim 14, wherein identifying the first source object and the first target object based on the first set of association criteria comprises:

receiving an event notification indicating an event occurred, the event associated with a source object, a target object, and a system action; and evaluating the event notification to determine whether:

a source object type of the source object matches the source object criteria of the first set of association criteria;

a target object type of the target object matches the target object criteria of the first set of association criteria;

the system action matches the system action criteria of the first set of association criteria; and a result of the event matches the condition criteria of the first set of association criteria.

17. The apparatus of claim 14, wherein the operations further comprise:

identifying a third source object and a third target object based on either the first set of association criteria or the second set of association criteria; and creating a third association object.

* * * * *